United States Patent [19]
Marshall

[11] Patent Number: 5,403,019
[45] Date of Patent: Apr. 4, 1995

[54] BALANCED FLOATING LABYRINTH SEAL

[75] Inventor: Dale F. Marshall, Friendship, N.Y.

[73] Assignee: Dresser-Rand Company, Olean, N.Y.

[21] Appl. No.: 56,516

[22] Filed: May 3, 1993

[51] Int. Cl.$^6$ .............................................. F16J 15/48
[52] U.S. Cl. ............................................ 277/53; 277/27; 277/173; 277/201
[58] Field of Search .................... 277/27, 53, 173, 174, 277/176, 177, 201

[56] References Cited

U.S. PATENT DOCUMENTS

| | | | |
|---|---|---|---|
| 967,247 | 8/1910 | Samuelson | 277/53 |
| 3,186,724 | 6/1965 | Wheatley | 277/59 |
| 3,231,285 | 1/1966 | Weltmer et al. | 277/53 |
| 3,462,159 | 8/1969 | Baumann et al. | 277/27 |
| 3,575,424 | 4/1971 | Taschenberg | 277/27 |
| 3,743,303 | 7/1973 | Pope | 277/27 |
| 3,912,342 | 10/1975 | Schirm et al. | 308/36.3 |
| 4,017,088 | 4/1977 | Lerjen | 277/53 |
| 4,118,040 | 10/1978 | Christ et al. | 277/75 |
| 4,199,152 | 4/1980 | Catterfeld | 277/3 |
| 4,337,951 | 7/1982 | Perego | 277/27 |
| 4,406,463 | 9/1983 | Fabrowsky | 277/53 |
| 4,466,620 | 8/1984 | Orlowski | 277/53 |
| 4,504,069 | 3/1985 | Stenlund | 277/174 |
| 4,579,349 | 4/1986 | Pipich et al. | 277/3 |
| 4,976,444 | 12/1990 | Richards | 277/53 |
| 5,015,000 | 5/1991 | Perini | 277/53 X |
| 5,085,443 | 2/1992 | Richards | 277/177 X |
| 5,169,159 | 12/1992 | Pope et al. | 277/53 x |
| 5,190,440 | 3/1993 | Maier et al. | 277/53 X |

FOREIGN PATENT DOCUMENTS

| | | |
|---|---|---|
| 2145968 | 2/1973 | France . |
| 532215 | 2/1973 | Switzerland . |
| 1133934 | 11/1968 | United Kingdom . |
| 1387009 | 3/1975 | United Kingdom . |
| 594380 | 2/1978 | U.S.S.R. . |

Primary Examiner—William A. Cuchlinski, Jr.
Assistant Examiner—John L. Beres
Attorney, Agent, or Firm—Richards, Medlock & Andrews

[57] ABSTRACT

A free floating labyrinth ring seal is sized to fit within a cavity to seal against a rotatable shaft to control excessive leakage of gas between high and low pressure chambers such as in a turbo machine. The seal is comprised of an elastomeric ring-shaped body with spaced opposing high and low pressure walls and a labyrinth seal surface extending therebetween for sealing with the shaft. The Walls have portions defining opposing surfaces of unequal area for pressure-balancing against each other within the cavity with a controlled gas flow clearance between the seal body and the walls of the cavity so that the seal body is substantially free to float with vibration of the shaft while maintaining close tolerance sealing between the labyrinth surface and the shaft as the latter rotates.

26 Claims, 3 Drawing Sheets

BALANCED FLOATING LABYRINTH SEAL

BACKGROUND OF THE INVENTION

1. Technical Field

This invention relates generally to a seal and seal assembly for sealing against a rotatable shaft. In particular, the invention is concerned with a labyrinth type seal such as may be used to seal against the leakage of gas between high and low pressure areas in a compressible fluid turbo machine.

2. Background Information

In a compressible fluid turbo machine such as a high speed centrifugal compressor, it is important to the efficiency of the machine that leakage of compressed gas between high and low pressure areas be kept as low as possible. This is particularly true along the rotatable shaft carrying the compressor impeller where the shaft extends through a support in the housing from an area of high pressure to an area of low pressure. One prior arrangement has been to utilize a fixed labyrinth seal assembly to seal between the housing and the shaft in the areas between high and low pressure. With such an arrangement, an annular seal body is mounted within an annular cavity in the housing. The impeller shaft extends through the seal body with a labyrinth portion of the body acting between the shaft and a sealing surface on the shaft to keep high pressure gas from leaking along the shaft into the low pressure area. As operating conditions of the compressor create higher pressure differentials between high and low pressure areas and the rotational speed of the shaft increases, closer tolerances are required between the labyrinth and shaft seal surfaces in order to keep leakage within acceptable limits. However, a problem is encountered as closer tolerances are required in that vibration of the shaft as it rotates may exceed tolerance clearances, causing the shaft to wear against the seal and premature failure of the seal.

SUMMARY OF THE INVENTION

In general, the present invention contemplates a labyrinth seal and assembly constructed in a novel configuration to more efficiently seal over a longer service life against the leakage of gas between high and low pressure areas of a turbo gas compressor than was achieved heretofore with the use of a fixed labyrinth seal. Specifically, closer tolerance clearances are provided between the labyrinth portion of the seal body and the sealing surface of the shaft by constructing the seal to float freely adjacent the shaft seal surface so that the seal itself is carried with the shaft as the latter deviates radially from its normal rotational movement.

The invention is particularly characterized in the construction of the seal to fit within the seal cavity between the high and low pressure areas of the turbo machine with differential pressure surfaces adjacent the high and low pressure areas so that a controlled float leakage of gas between the seal and the cavity is utilized to support the seal substantially balanced between opposing walls of the cavity thereby enabling the seal to float freely radially with the shaft so that contact between the shaft and the seal is avoided while maintaining the labyrinth surface close to the sealing surface of the shaft.

In one embodiment of the invention, float leakage from the high pressure area is controlled by a leakage path of predetermined size communicating between the high pressure area and an intermediate pressure chamber defined by the clearances between the seal and the walls of the cavity. An o-ring acts between the seal and the wall of the cavity adjacent the high pressure area to seal against high pressure gas flowing into the intermediate pressure chamber other than through the leakage path. Adjacent the low pressure area, the land acts between the wall of the Cavity and the seal body controlling the outflow of gas from the intermediate pressure chamber. The seal is thus supported within the cavity balanced between the walls of the cavity and cushioned by gas flow between the land and the adjacent cavity wall and the opposing squeeze on the o-ring.

In an alternative embodiment, the leakage path is defined by a second annular land acting between the seal body and the cavity wall adjacent the high pressure chamber.

The foregoing and other advantages of the present invention will become more apparent from the following description of the preferred embodiment when taken in conjunction with the accompanying drawings.

BEST MODE FOR CARRYING OUT THE INVENTION

Figure 1:
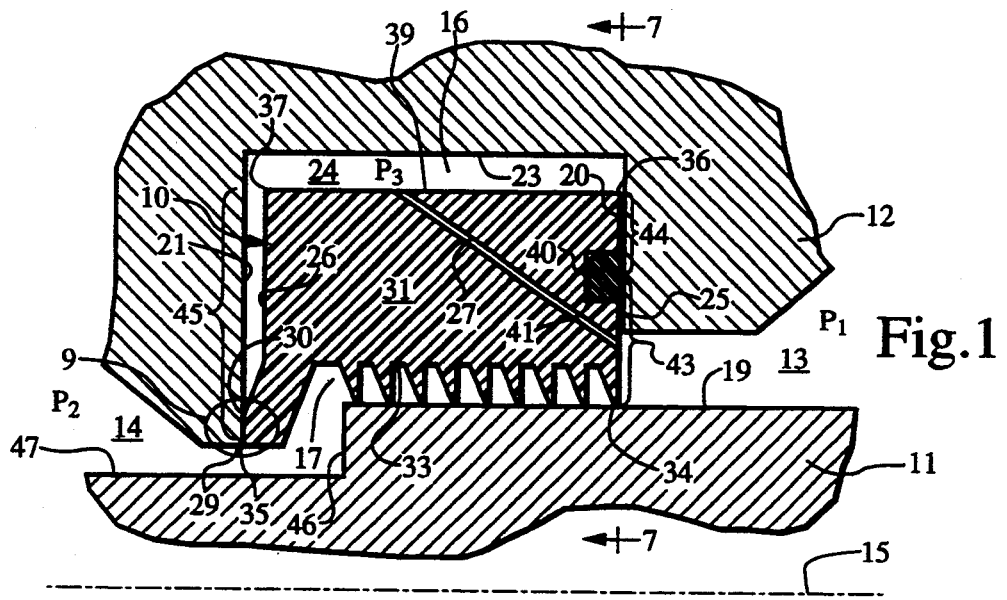
FIG. 1 is a fragmentary cross-sectional view of a seal assembly embodying the novel features of the present invention.

As shown in the drawings for purposes of illustration, the present invention is embodied in a seal and seal assembly 10 particularly suited for use in a turbo machine (not shown) such as a centrifugal compressor. The seal is used to seal against excessive leakage of gas along a rotatable shaft 11 extending between high and low pressure chambers 13 and 14 within a housing 12 of the turbo machine. A preferred form of the invention is illustrated in FIG. 1 which is an enlarged schematic cross-sectional view of the seal assembly 10 in order to more clearly show structural details. For orientation purposes, a rotational axis of the impeller shaft 11 is identified by the reference number 15 and the components of the seal assembly while shown in cross-section are, except where otherwise noted herein, concentric to the axis 15. As shown, the seal 10 is positioned within an annular cavity 16 and has an annular inside labyrinth surface 17 in sealing engagement with the outer surface 19 of the impeller shaft 11. The cavity 16 is effectively formed as an annular groove within the turbo machine housing and includes axially spaced side walls 20 and 21 with an outer wall 23 extending therebetween concentrically relative to the shaft 11. Located axially inward (toward the right in FIG. 1) of the cavity 16 between the outer surface 19 of the shaft and the housing 12 is the high pressure chamber 13 which typically is in pressure communication with the high pressure discharge gas from the impeller (not shown) of the compressor. Located axially outward (toward the left in FIG. 1) of the cavity 16 and between the outer surface 19 of the shaft and the housing 12 is the low pressure chamber 14. The pressure in this chamber 14 may be, for example, the next immediate upstream pressure of a multi-stage compressor.

The extent to which gas leaks along the shaft 11 from the high pressure chamber 13 to the low pressure chamber 14 depends primarily upon the cross-sectional area of the leakage path available between the shaft 11 and the seal 10 and the magnitude of the differences in the pressures $P_1$ and $P_2$ existing in the high and low pressure chambers 13 and 14, respectively. Concentricity of the labyrinth sealing surface 17 relative to the outer sealing surface 19 of the shaft as it rotates plays an important part in maintaining an effective seal between the high and low pressure chambers. In prior sealing arrangements wherein the labyrinth seals are substantially fixed in a radial position within the housing, the radially directed displacement of the shaft 11 relative to the housing 12 has a limiting effect upon the closeness of the clearance fit between the labyrinth sealing surface 17 and the shaft 11. If too close, the tips of the teeth of the labyrinth sealing surface 17 can become quickly worn by high speed contact with the surface 19 of the shaft 11 as it rotates.

In accordance with the present invention, the labyrinth seal 10 is sized to fit within the seal cavity 16 with clearances between the walls of the seal and the walls of the cavity defining an intermediate pressure chamber 24. Opposing wall surfaces 25 and 26 of the seal 10 adjacent the high and low pressure chambers 13 and 14 are pressure balanced by the pressures in the intermediate chamber 24 and the high pressure chamber 13, respectively. Advantageously, gas pressure is provided to the intermediate chamber 24 by way of a predetermined inlet leakage path 27 of controlled dimension limiting flow of high pressure gas into the intermediate chamber 24. At an outlet 29 of the intermediate pressure chamber 24, a land 30 acting between the seal 10 and the cavity wall 21 controls the leakage of gas from the intermediate pressure chamber 24 toward the low pressure chamber 14. As a result, axially directed forces acting on the seal 10 are substantially equalized allowing the seal 10 to float radially with the shaft 11 while maintaining close tolerance clearance between the surface 19 of the shaft 11 and the tips of the teeth of the labyrinth seal surface 17.

In the present instance and in contrast to prior labyrinth gas seals, the preferred form of the seal 10 includes a body 31 which is comprised of a lightweight yet wear resistant material such as one of the thermoplastic poly(amide-imide) or poly(ether ether ketone) materials described in U.S. Pat. No. 4,976,444. Desirably, these materials are highly resistant to rubbing wear and are light in weight having specific gravities approximating one-half that of aluminum but also having high strength relative to aluminum. Structurally, the seal body 31 is ring-shaped (see also FIG. 6) with axially spaced generally radially extending high pressure and low pressure end walls 25 and 26. The labyrinth sealing surface 17 extends in a generally axial direction along a portion of an inside surface 33 of the body 31 between radially inner edges 34 and 35 of the end walls 25 and 26, respectively. Extending in an axial direction between outer edges 36 and 37 of the .end walls 25 and 26, respectively, is an outer wall 39 of the body 31.

As shown in FIG. 1, the size of the seal body 31 is such that clearances between the walls 25, 26 and 39 of the seal 10 and the walls 20, 21 and 23 of the cavity 16 define the intermediate pressure chamber 24. Pressure within this chamber is controlled so that the resulting axially directed force acting on the end walls 25 and 26 of the seal body 31 produce an inconsequential reaction to radially directed forces which may be generated between the labyrinth surface 17 and the outer sealing surface 19 of the shaft 11 when the shaft 11 rotates eccentrically relative to its normal axis 15. As the shaft 11 rotates relative to the tips of the teeth of the labyrinth surface 17, a pin 38 anchored in the side wall 21 (see FIGS. 7 and 8) of the housing 12 keeps the seal body 31 from rotating with the shaft 11 in the cavity 16. The pin extends axially from the wall 21 into a U-shaped slot 42 formed radially inwardly from an opening in the outer wall 39 of the seal body 31. The axial depth of the slot 42 is greater than the length of the pin 38 projecting from wall 21. As a result, the seal body 31 is free to effectively float on the outer surface 19 of the shaft 11, moving radially but not rotating within the cavity 16 while maintaining extremely close tolerance clearance between the outer surface 19 of the shaft 11 and the tips of the teeth of the labyrinth surface 17. In contrast to prior art tolerance clearances for fixed metallic labyrinth seals requiring clearances on the order of 10–20 mils and sometimes in the range of 30–40 mils, the present invention contemplates tolerance clearances on the order of zero to one or two mils. Such clearances are of course significantly less than the radially directed deviation of the shaft 11 which may be as much as forty mils (0.04 inch) during rotation depending upon the location of the seals within the space between bearings supporting the shaft.

In order to achieve effective pressure balanced equilibrium of the seal 10 within the cavity 16, balanced pressure surfaces are provided on the high and low pressure end walls 25 and 26, respectively, so that the total force acting against the low pressure end wall 26 toward the high pressure chamber 13 is virtually equal to the total force acting against the high pressure end wall 25 toward the low pressure chamber 14. In the embodiment of the invention shown in FIG. 1, the high pressure end wall 25 includes an o-ring 40 captured within an annular groove 41 between the seal body 31 and the seal cavity side wall 20. The o-ring 40 functions in part as an inlet leakage control member which normally keeps high pressure gas from flowing between the end wall 25 of the seal 31 body and the cavity wall 20 into the intermediate pressure chamber 24. Defined radially inwardly of the o-ring 40 on the end wall 25 is an inner pressure surface 43. This surface 43 (as indicated by the numbered bracket in FIG. 1) is exposed to the higher gas pressure $P_1$ existing in the high pressure gas chamber 13. On the high pressure end wall 25 radially outwardly of the o-ring 40 is an outer surface 44 which is exposed to an intermediate gas pressure $P_3$ existing in the intermediate pressure chamber 24. The intermediate pressure $P_3$ also acts against the low pressure end wall 26 but radially outward of the annular land 30. The latter is integrally formed with the low pressure end of the seal body 31 and projects axially therefrom toward the cavity wall 21 from adjacent the inner edge 35 of the low pressure end wall 26.

Figure 9:
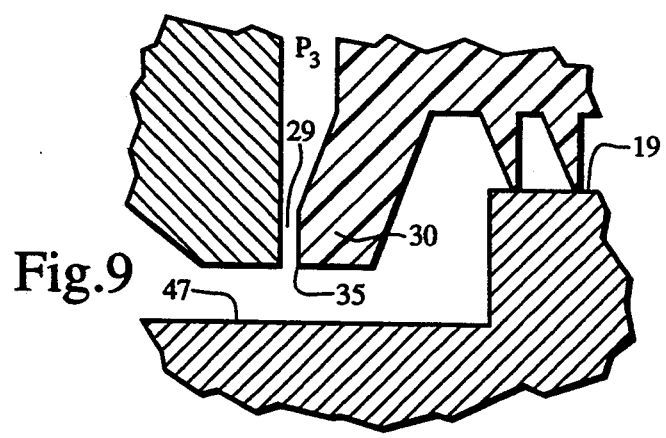
FIG. 9 is an enlarged view of the area 9 identified in FIG. 1.

Between the radial face of the land 30 and the cavity wall 21 is defined the pressure controlling outlet 29 (see detail FIG. 9) for the intermediate pressure chamber 24. The width of this outlet 29 is adjustable in an axial direction depending upon the magnitude of the difference in the pressures $P_1$ and $P_3$. Specifically herein, the area of the low pressure end wall 26 radially between the inner edge 35 of the land 30 and the outer edge 37 (shown in FIG. 1) defines an intermediate pressure surface 45. For balancing the axially directed pressures acting on the seal 10, the area of the intermediate pressure surface 45 is chosen to be in excess of the area of the outer surface 44 of the high pressure end wall 25 by a selected amount exceeding the area of the inner surface 43. The magnitude of the range of differences of pressure $P_1$ and $P_2$ for normal operation of the turbo machine dictates the extent of the excess area of the intermediate pressure surface 45. In general, for example, a lower difference between the high and low pressures $P_1$ and $P_2$ will result in the outlet 29 having an axial width which is slightly smaller than the width of the outlet for a higher difference in the pressures $P_1$ and $P_2$. In accomplishing this, the land 30 is preferably located radially inwardly of the tips of the labyrinth teeth. However, at a minimum it is important that the area of the intermediate pressure surface 45 exclusive of the face of the land 30 must not be less than the sum of the areas of the inner and outer pressure surfaces 43 and 44. This will insure that the effect of the transition of pressure from $P_3$ to $P_2$ across the face of the land 30 will cause opening of the outlet 29 upon startup of the compressor. AS a practical matter, the outer edge of the land 30 may be located such that the area of the intermediate pressure surface exclusive of the face of the land 30 may be equal to the sum of the areas of the pressure surfaces 43 and 44 and the transition pressure acting on the face of the land 30 will cause the seal body 31 to shift the opening of the outlet 29. Enabling the land 30 to protrude radially inwardly of the labyrinth teeth is a shoulder 46 formed on the shaft 11. The shoulder 46 is spaced axially from the wall 21 and extends radially inward to a reduced diameter section 47. With this structural arrangement, it is assumed that with rotation upon start up, when $P_3$ is equal to $P_1$ and greater than $P_2$, the land 30 will lift off the cavity side wall 21. As shown in FIG. 1, the pressure inlet to the cavity 24 is through the leakage path or bore 27. Herein, the 27 bore is a predetermined cross-sectional dimension for flow control purposes and communicates between the high pressure chamber 13 and the intermediate chamber 24. In the exemplary form of the invention, the bore 27 extends through the seal body 31 from an inlet located in the inner pressure surface 43 of the high pressure end wall 25 to an outlet in the outer wall 39. In design of the seal 10, the diameter of the bore 27 is chosen to provide for the face of land 30 to lift away from the cavity side wall 21 by an amount not exceeding 0.001 to 0.002 inch or such other amount as will avoid wearing contact between the surfaces for a given application.

In service use, with the foregoing described seal 10, balancing of the seal body 31 between the side walls 20 and 21 of the cavity 16 effectively eliminates resistance of the seal 10 to movement radially within the housing 12. Only a slight resistance to radial movement results from the squeeze of the o-ring 40 between the bottom of the groove 41 and the cavity wall 20. Specifically, in reaching the balancing of the seal 10 within the cavity 16, flow through the bore 27 causes the intermediate pressure $P_3$ in intermediate chamber 24 to act on the intermediate pressure surface 45 and overcome the combined forces of the high pressure $P_1$ acting on the inner pressure surface 43 and the resistance to squeeze of the o-ring 40. Balancing occurs when the flow into the intermediate chamber 24 through the bore 27 is balanced with the flow out of the intermediate chamber 24 through the outlet 29. As a result, when the shaft 11 moves radially while rotating, the seal 10 is carried along with the shaft 11 virtually avoiding any wearing contact between the tips of the teeth of the labyrinth surface 17 and the outer surface 19 of the shaft 11.

Figure 2:
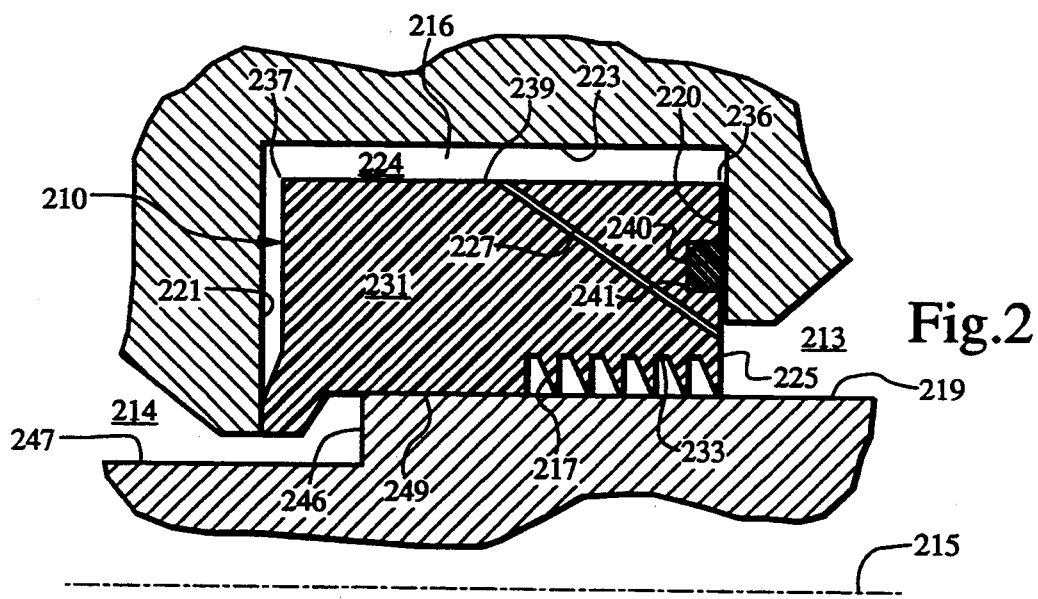
FIG. 2 is a fragmentary cross-sectional view similar to FIG. 1 showing an alternate embodiment of the present invention.
Figure 3:
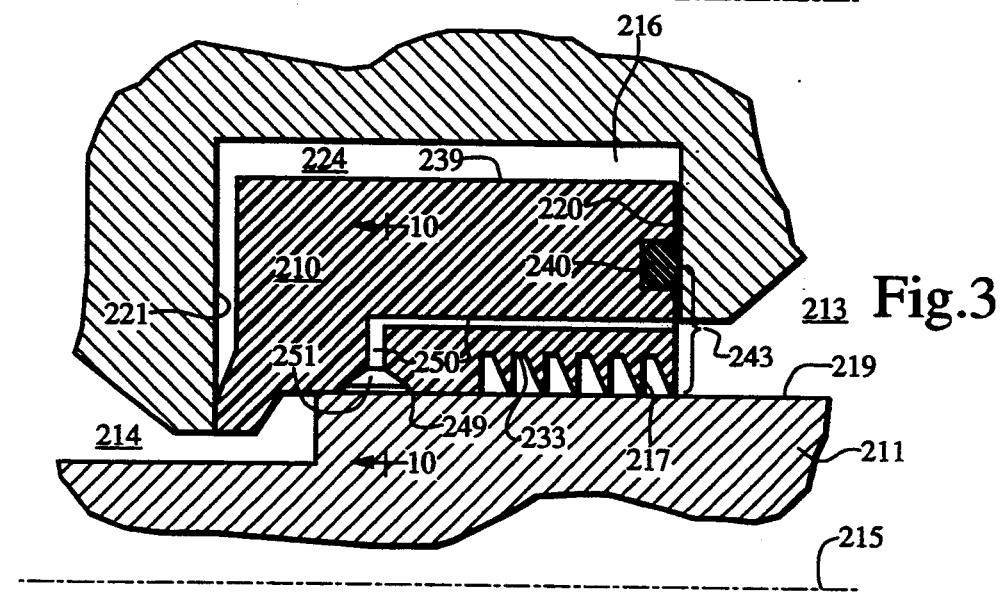
FIG. 3 is a fragmentary cross-sectional view of the alternate embodiment shown in FIG. 2 but with the view taken in a radial plane rotated relative to the view shown in FIG. 2.

A first alternate version of the seal 10 is shown in FIGS. 2 and 3 with corresponding parts identified by two hundred series reference numbers utilizing the same tens and units digits as the reference numbers for similarly functioning parts described in connection with the embodiment of the invention illustrated in FIGS. 1 and 6. Additional alternate embodiments are disclosed in FIGS. 4 and 5 with corresponding parts identified similarly with four and five hundred series reference numbers.

With respect to the alternative version of the present invention disclosed in FIGS. 2 and 3, one primary difference in the structure of the seal 210 is the construction of the inside surface 233 of the body 231. Downstream of the labyrinth portion 217 is a hydrodynamic bearing section 249 which is in bearing contact with the outer surface 219 of the shaft 211. The bearing section 249 is substantially equal in diameter to the diameter of the tips of the labyrinth teeth. As such the embodiment of FIG. 2 provides additional radial centering of the seal 210 on the shaft 211 and reduces the leakage of gas between the inside surface 233 of the seal 210 and the shaft 211.

Figures 7, 10:
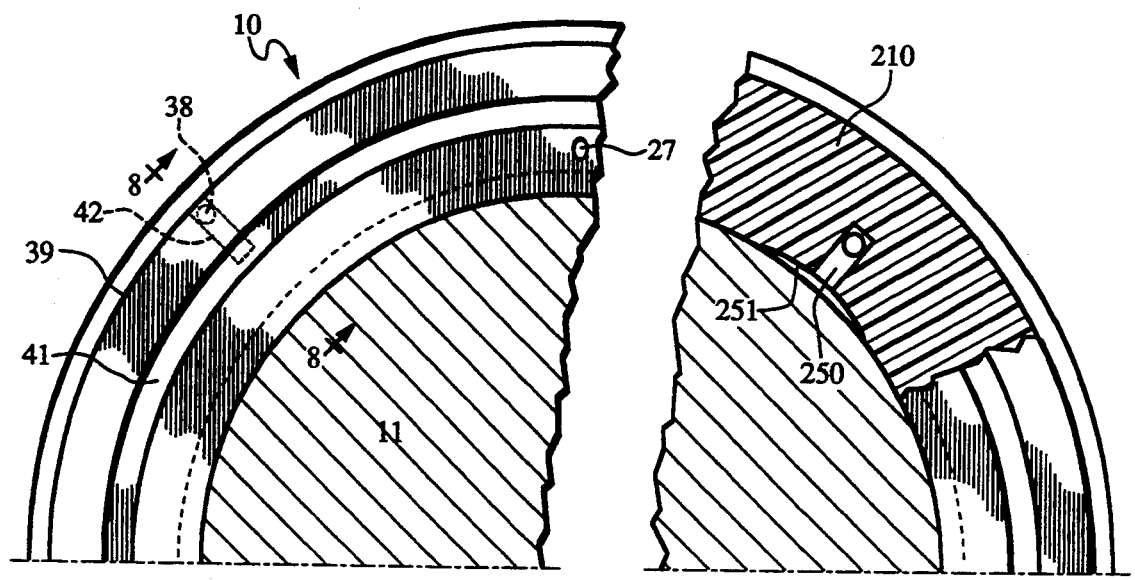
FIG. 7 is a fragmentary end view taken substantially along line 7—7 of FIG. 1.
FIG. 10 is a fragmentary end view, partly in cross section taken substantially along line 10—10 of FIG. 3.
Figure 8:
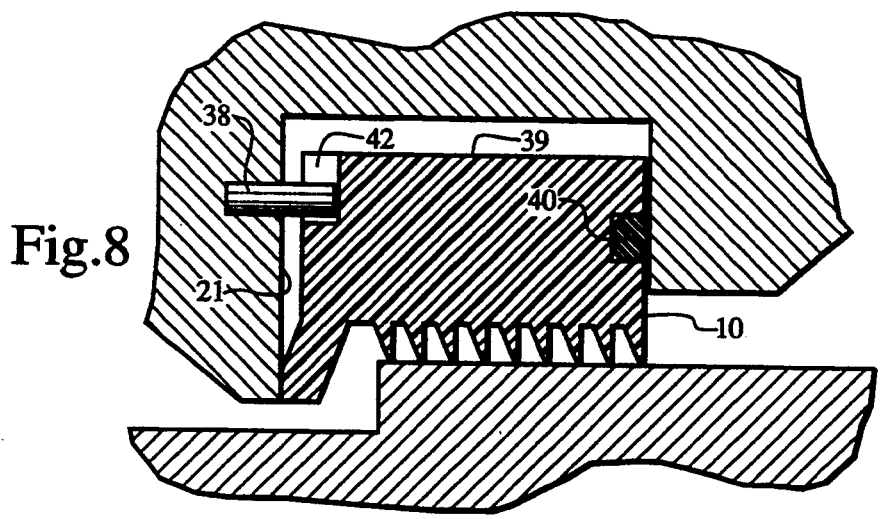
FIG. 8 is a fragmentary cross-sectional view taken substantially along line 8—8 of FIG. 7.

A feature of the embodiment disclosed in FIG. 2 which further aids hydrodynamic radial centering in the bearing section 249 is more particularly shown in FIG. 3. With this feature high pressure from chamber 213 is utilized to aid in the centering of the seal 210 on the shaft 211. This is accomplished through the provision of a number of high pressure leakage paths 250 communicating between the high pressure chamber 213 and the bearing section 249. Specifically, four to eight of the paths 250 are provided and are equally spaced angularly from each other within the seal 210. One of the high pressure leakage paths 250 is shown in FIG. 3 as being representative of all and includes an axially extending leg opening from the inner pressure surface 243 of the high pressure wall 225 of the seal and a radially extending leg (see FIG. 10) with an outer end connected to the inner end of the axial leg. An inner end of the radial leg opens into a hydrostatic centering pocket 251. As is shown in FIG. 10, each pocket 251 extends in a circumferential direction for a distance greater than its axially directed width (compare FIG. 3). One such pocket 251 exists for each path 250 and the circumferential ends of adjacent pockets 251 are also equal angularly spaced from each other around the axis 215 of the shaft 211 within the bearing surface 249. Thus, the high pressure paths 250 deliver pressure flow from the high pressure chamber 213 to the centering pockets 251 so as to center the seal 210 radially with respect to the shaft 211 as the latter rotates. The seal 210 is pinned against rotation within the cavity 216 in the same manner as the embodiment disclosed in FIG. 1.

Figure 4:
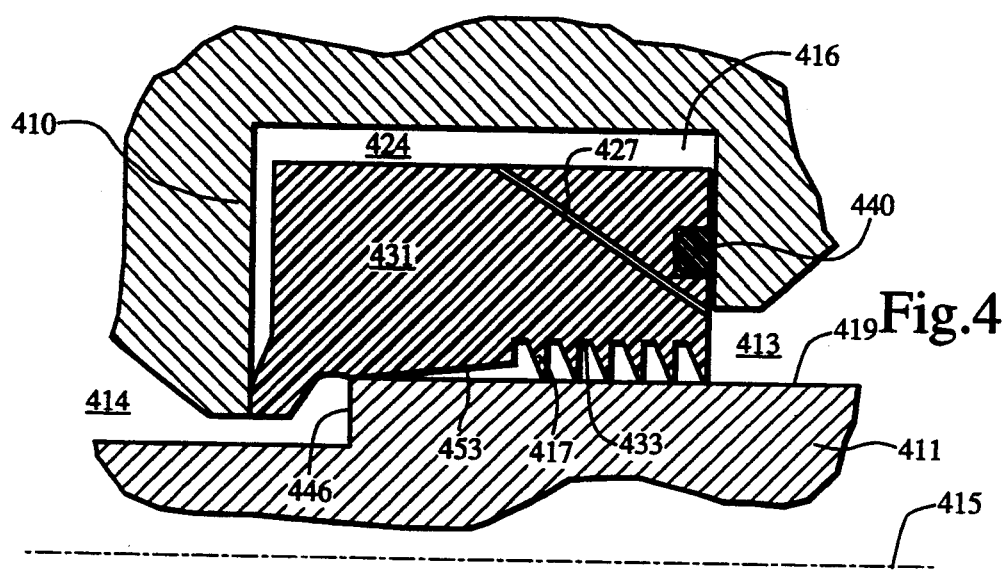
FIGS. 4 and 5 are fragmentary cross-sectional views similar to FIG. 1 showing still other alternate embodiments of the present invention.

In FIG. 4 is illustrated still another form of the present invention directed to improved centering of a seal 410 on a rotatable shaft 411. In this form of the invention, the inside surface 433 of the seal body 431 includes a tapered section 453 beginning immediately downstream of the labyrinth surface 417. The section 453 tapers radially inwardly toward the outer surface 419 of the shaft 411 from a beginning end which is intermediate the depth of the teeth of the labyrinth section to a closest approach to the outer surface 419 of the shaft 411 of virtually zero clearance relative to the outer surface 419 of the shaft 411 adjacent the upstream side of the shaft shoulder 446. Flow into the converging area defined by the tapered section 453 is provided by a slight additional clearance between the tips of the teeth of the labyrinth and the outer surface 419 of shaft 411.

Figure 5:
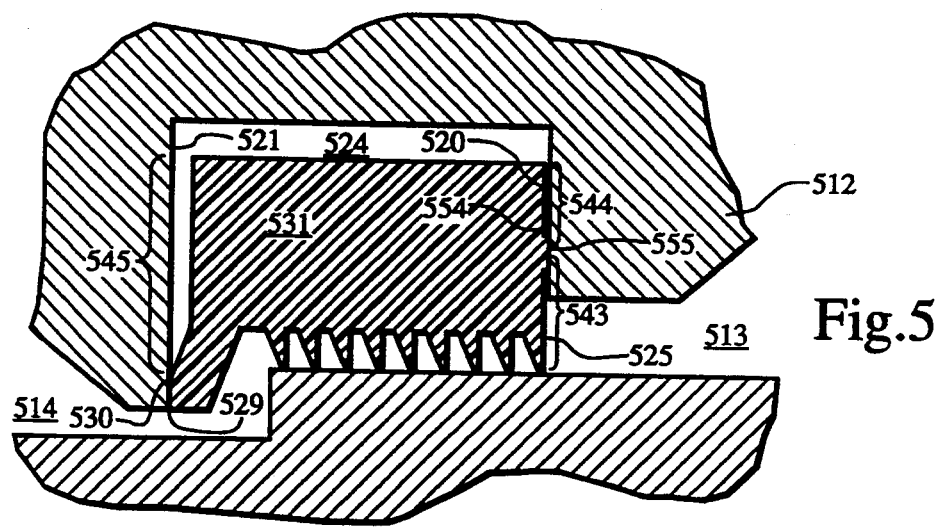
Figure 6:
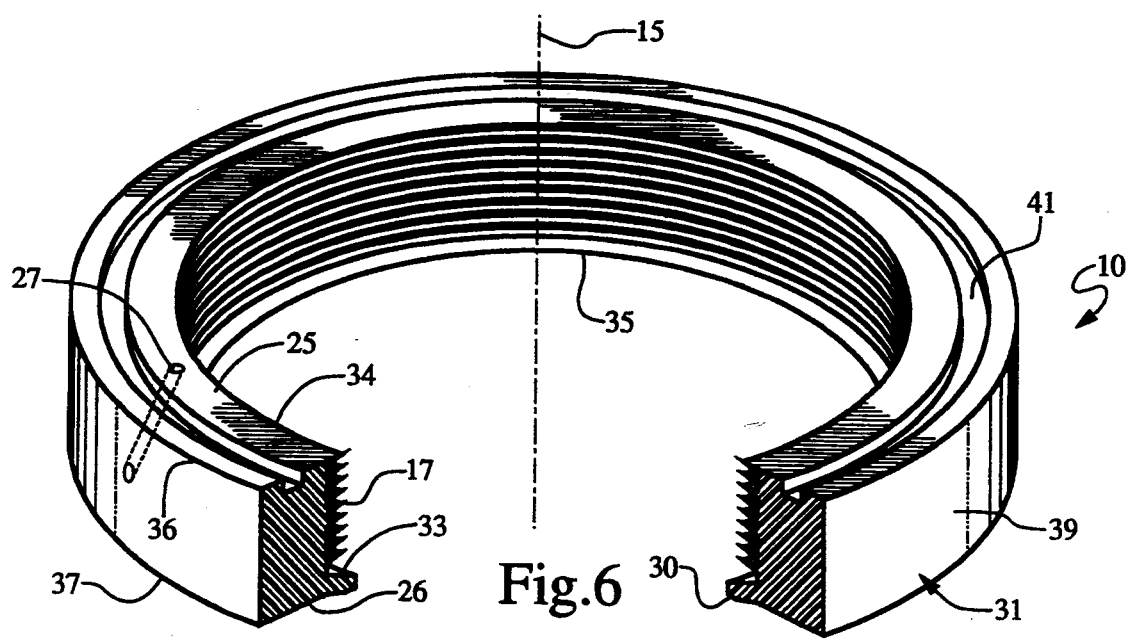
FIG. 6 is an isometric view of the seal shown in FIG. 1 with a portion of the seal broken away for clarity of illustration.

A slightly differing version of the present invention is illustrated in FIG. 5 wherein corresponding parts are identified by the use of five hundred series numbers with the same tens and units digits used in identifying the corresponding parts in FIGS. 1–4. In the FIG. 5 embodiment of the invention, instead of utilizing a fixed size of bypass leakage bore such as the leakage bore 27 shown in FIG. 1, a variable size leakage passage 554 is provided between the high pressure chamber 513 and the intermediate pressure chamber 524. The passage 554 is defined between an annular ridge 555 and the high pressure end cavity wall 520. Specifically, the ridge is formed in the high pressure end wall 525 and protrudes axially therefrom toward the cavity side wall 520. As measured in an axial direction from the face of the land 530 to the face of the annular ridge 555, the overall length of the seal body 531 is less than the axial distance between the cavity walls 520 and 521 by an amount equal to the sum of the design clearance leakages of the inlet (through passage 554) and outlet 529 of the intermediate pressure chamber 524.

In operation of the FIG. 5 embodiment, high pressure gas from chamber 513 flows through the leakage passage 554 causing the intermediate pressure in chamber 524 to act on the intermediate pressure surface 545. When this force overcomes the axial force of the high pressure acting on the inner pressure surface 543, the seal body 531 shifts to the right in FIG. 5 causing the land 530 to move away from the cavity wall 521 and thereby reducing the pressure in the intermediate pressure chamber 524. Ultimately, in the same manner that equilibrium is established in the operation of the seal 10 of FIG. 1, equilibrium is established in positioning of the seal body 531 between the cavity walls 520 and 521. When equilibrium is reached, a small amount of flow passes between the cavity wall 520, 521 and the land 530 and ridge 555 with no contact between the seal body 531 and the housing 512.

Thus, it is seen from the foregoing described several embodiments this present invention provides a novel labyrinth seal particularly adapted to achieve a high degree of sealing between high and low pressure chambers by enabling closer tolerance fit between the seal and the shaft but without the usual damage resulting to the seal from shaft vibration.

I claim:

1. A labyrinth seal assembly for use within the housing of a turbo machine to seal between high and low pressure chambers against the excessive leakage of a compressible fluid along a shaft mounted within the housing for rotation about a longitudinal axis, said assembly comprising:
   a seal surface formed on said shaft and extending in an axial direction within said housing between said high and low pressure chambers;
   an annular cavity within said housing surrounding said seal surface and having:
      a high pressure side wall adjacent the high pressure chamber and extending in a generally radial direction a selected first distance,
      a low pressure side wall spaced axially from said high pressure side wall a specified distance and located adjacent the low pressure chamber, said low pressure side wall extending in a generally radial direction a selected second distance, said selected second distance being greater than said selected first distance, and
      an outer wall extending between said side walls;
   a sealing element having a ring-shaped body sized to fit within said cavity, said body having:
      an annular high pressure end wall extending in a generally radial direction and having inner and outer edges radially spaced from each other a preset distance,
      an opposite annular low pressure end wall axially spaced from said high pressure end wall a distance less than said specified distance and having inner and outer edges radially spaced from each other a distance greater than said preset distance,
      an intermediate pressure outer wall extending in an axial direction between said outer edges of said end walls,
      an inside surface extending in an axial direction generally between said inner edges of said end walls and including a labyrinth portion formed therein for sealing engagement with said seal surface of said shaft;
   an inlet control member associated with said high pressure end wall and said high pressure side wall for controlling the flow of high pressure fluid there past from said high pressure chamber; and
   a pressure control surface associated with said low pressure end wall and said low pressure side wall for controlling the flow of fluid there past toward said low pressure chamber;
   said body being insertable within said cavity with clearances between said walls of said body and said walls of said cavity defining an intermediate pressure chamber and said inlet control member acting between said high pressure end wall and said high pressure side wall and said pressure control surface acting between said low pressure end wall and said low pressure side wall to permit movement of said body both radially and axially in said cavity for pressure balanced control of floating fluid leakage between said body and said housing.

2. A labyrinth seal assembly as defined in claim 1 wherein said sealing element is formed of a thermoplastic material selected from the group consisting of poly(amide-imide) and poly(ether ether ketone).

3. A gas seal for use within a seal cavity surrounding a rotatable shaft and located between high and low pressure chambers, said seal having a ring-shaped body and sized to fit within the cavity with predetermined cavity clearances both in radial and axial directions;

said body having radially extending high and low pressure end walls axially spaced from each other;

an outer wall extending in an axial direction between said end walls;

an inside surface spaced radially inwardly from said outer wall and extending in an axial direction generally between said end walls, said inside surface including a labyrinth portion formed therein for sealing engagement with the shaft; and inlet and outlet pressure control means associated with said high and low pressure end walls, respectively, for controlling the flow of leakage into and out of said cavity clearances from said high pressure chamber to said low pressure chamber, said inlet and outlet pressure control means including an annular inlet leakage control member on said high pressure end wall and dividing said high pressure end wall into an inner surface and an outer surface, and an annular leakage control land on said low pressure end wall and defining thereon an annular intermediate pressure surface radially inwardly of said outer wall, said intermediate pressure surface having an area in excess of the area of said outer surface by an amount greater than the area of said inner surface of said high pressure end wall for controlling the flow of leakage from said high pressure chamber to said low pressure chamber so that the total force acting against the low pressure end wall toward the high pressure chamber is virtually equal to the total force acting against the high pressure end wall toward the low pressure chamber so that said body may be substantially pressure balanced in an axial direction within the cavity and free to float in a radial direction while maintaining the sealing engagement between said labyrinth portion and said shaft.

4. A gas seal as defined by claim 3 wherein said land is integrally formed with said body.

5. A gas seal as defined in claim 3 wherein said ring-shaped body is formed of a thermoplastic material selected from the group consisting of poly(amide-imide) and poly(ether ether ketone).

6. A gas seal for use within a seal cavity surrounding a rotatable shaft and located between high and low pressure chambers;

said seal having a ring-shaped body and sized to fit within the cavity with predetermined cavity clearances both in radial and axial directions;

said body having radially extending high and low pressure end walls axially spaced from each other, an outer wall extending in an axial direction between said end walls, and an inside surface spaced radially inwardly from said outer wall and extending in an axial direction generally between said end walls, said inside surface including a labyrinth portion formed therein for sealing engagement with the shaft; and inlet and outlet pressure control means associated with said high and low pressure end walls, respectively, for controlling the flow of leakage into and out of said cavity clearances from said high pressure chamber to said low pressure chamber, said inlet and outlet pressure control means including:

an annular inlet leakage control member on said high pressure end wall and dividing said high pressure end wall into an inner surface and an outer surface, and an annular leakage control land on said low pressure end wall and defining thereon an annular intermediate pressure surface radially inwardly of said outer wall, said annular intermediate pressure surface having an area in excess of the area of said outer surface by an amount greater than the area of said inner surface of said high pressure end wall for controlling the flow of leakage from said high pressure chamber to said low pressure chamber so that said body can be substantially press are balanced in an axial direction within the cavity and free to float in a radial direction while maintaining the sealing engagement between said labyrinth portion and said shaft;

wherein said inlet leakage control means includes an o-ring associated with said high pressure end wall for acting between said high pressure end wall and a wall of said cavity, and a by-pass passage communicating between said high pressure chamber and said cavity downstream of said o-ring.

7. A gas seal as defined by claim 6 wherein said by-pass passage includes an inlet within said body radially inward of said o-ring and outlet within said body radially outward of said o-ring.

8. A gas seal as defined by claim 6 wherein said body has an axial length as measured from said control land through said o-ring which is less than the axial length of said cavity so that when pressure balanced an intermediate pressure acts on said intermediate pressure surface against high pressure on said inner surface and a squeeze reaction force on said o-ring, said intermediate pressure being sufficient to keep high pressure from flowing between said o-ring and said cavity wall.

9. A gas seal as defined in claim 6 wherein said ring-shaped body is formed of a thermoplastic material selected from the group consisting of poly(amide-imide) and poly(ether ether ketone).

10. A floating labyrinth seal element for use within a seal cavity of a turbo machine housing to seal between high and low pressure chambers against excessive leakage of a compressible fluid along an axially extending seal surface of a rotatable shaft mounted within the housing, said element having a ring-shaped body and sized to fit within the cavity with predetermined clearances both in radial and axial directions defining an intermediate pressure chamber between said ring-shaped body and the cavity walls, said ring-shaped body having:

an annular high pressure end wall having inner and outer edges radially spaced from each other a preset distance, an annular low pressure end wall axially spaced from said high pressure end wall and having inner and outer edges radially spaced from each other a distance greater than said preset distance, an outer wall extending in an axial direction between said outer edges of said end walls, and an inside surface extending in an axial direction generally between said inner edges of said end walls and including a labyrinth portion formed therein for sealing engagement with the seal surface of the rotatable shaft, and inlet and outlet pressure control means associated with said high and low pressure end walls, respectively, for controlling the fluid pressure in the intermediate pressure chamber in response to the differential between the fluid pressures in the high and low pressure chambers to keep the seal element in floating leakage sealing engagement with the wall of the cavity adjacent the high pressure chamber, said inlet and outlet pressure control means including:

an annular inlet leakage control member on said high pressure end wall between the inner and outer edges thereof and dividing said high pressure end wall into an inner surface for exposure to high pressure fluid in the high pressure chamber and an outer surface for exposure to fluid pressure in the intermediate pressure chamber, and an annular leakage control land associated with said low pressure end wall and defining thereon an annular intermediate pressure surface extending radially inwardly from said outer edge of said low pressure end wall, said intermediate pressure surface having an area in excess of the area of said outer surface by an amount greater than the area of said inner surface of said high pressure end wall for controlling the flow of intermediate pressure fluid past said land and toward the low pressure chamber so that said body may be substantially pressure balanced in an axial direction within the cavity and thereby free to float in a radial direction with such movement of said shaft while maintaining the seal between said labyrinth portion and said seal surface.

11. A seal element as defined by claim 10 wherein said inlet leakage control member is a ridge.

12. A seal element as defined by claim 11 wherein said ridge is integrally formed with said body in said high-pressure end wall and protrudes in an axial direction therefrom toward said cavity wall.

13. A seal element as defined by claim 8 wherein said inlet leakage control member includes an o-ring associated with said high pressure end wall.

14. A seal element as defined by claim 13 including an annular groove formed in said high pressure end wall, said o-ring being mounted in said groove.

15. A seal element as defined by claim 13 including a bypass leakage bore communicating between said inner surface of said high pressure end wall and said intermediate pressure chamber.

16. A seal element as defined by claim 8 wherein said inside surface includes a bearing portion downstream of said labyrinth portion.

17. A seal element as defined by claim 16 further including a plurality of high pressure paths communicating between said high pressure chamber and said inside surface downstream of said labyrinth portion, said high pressure paths each having an inlet end, an outlet end and a centering pocket in communication with each other, said inlet ends opening from said inner surface and said outlet ends and pockets being located in said bearing portion, said centering pockets being spaced equal angularly from each other.

18. A seal element as defined by claim 8 wherein said inside surface includes a tapered wall portion downstream of said labyrinth portion, said tapered wall portion narrowing upon progressing away from said labyrinth portion.

19. A seal element as defined by claim 8 wherein at least a portion of said leakage control land is radially spaced inwardly from said labyrinth portion.

20. A seal element as defined in claim 10 wherein said ring-shaped body is formed of a thermoplastic material elected from the group consisting of poly(amide-imide) and poly(ether ether ketone).

21. A free floating labyrinth gas seal comprising a housing through which a shaft extends from a high pressure chamber to a low pressure chamber, said housing having an annular cavity surrounding said shaft, and a ring seal sized to fit within said annular cavity to seal against said shaft to control excessive leakage of gas between said high pressure chamber and said low pressure chamber and to define an intermediate pressure chamber between said ring seal and walls of said cavity, said ring seal having a body with spaced opposing high and low pressure walls and a labyrinth seal surface extending therebetween for sealing with the shaft, an annular inlet leakage control member associated with said high pressure wall dividing said high pressure wall into an inner annular surface for exposure to high pressure fluid in the high pressure chamber and an outer annular surface for exposure to fluid pressure in the intermediate pressure chamber, a by-pass passage communicating between said high pressure chamber and said intermediate pressure chamber, and an annular outlet leakage control member associated with said low pressure wall and defining thereon an annular intermediate pressure surface extending radially inwardly from an outer edge of said low pressure wall.

22. A gas seal as defined by claim 21 wherein said by-pass passage includes an inlet within said body radially inward of said annular inlet leakage control member and an outlet within said body radially outward of said annular inlet leakage control member.

23. A gas seal as defined by claim 21 wherein said annular inlet leakage control member includes an o-ring, wherein said annular outlet leakage control member includes an annular control land, and wherein said body has an axial length as measured from said control land through said o-ring which is less than the axial length of said cavity so that when pressure balanced an intermediate pressure acts on said intermediate pressure surface against high pressure on said inner surface and a squeeze reaction force on said o-ring, said intermediate pressure being sufficient to keep high pressure from flowing between said o-ring and cavity wall.

24. A gas seal as defined by claim 23 wherein said by-pass passage includes an inlet within said body radially inward of said o-ring and an outlet within said body radially outward of said o-ring.

25. A gas seal as defined by claim 21 wherein said annular intermediate pressure surface has an area in excess of the area of said outer annular surface by an amount greater than the area of said inner annular surface of said high pressure wall for controlling the flow of leakage from said high pressure chamber to said low pressure chamber.

26. A gas seal as defined by claim 21 wherein said annular inlet leakage control member includes a ridge integrally formed with said body in said high-pressure wall and protruding in an axial direction therefrom toward said cavity wall.

* * * * *

UNITED STATES PATENT AND TRADEMARK OFFICE
CERTIFICATE OF CORRECTION

PATENT NO. : 5,403,019
DATED : April 4, 1995
INVENTOR(S) : Dale F. Marshall

It is certified that error appears in the above-indentified patent and that said Letters Patent is hereby corrected as shown below:

```
Column 8, lines 45-46, delete "there past" and insert
    --therepast--.
Column 8, line 49, delete "there past" and insert
    --therepast--.
Column 10, line 15, delete "press are" and insert
    --pressure--.
Column 10, line 28, after "and" insert --an--.
Column 11, line 41, delete "claim 8" and insert
    --claim 10--.
Column 11, line 51, delete "claim 8" and insert
    --claim 10--.
Column 11, line 64, delete "claim 8" and insert
    --claim 10--.
Column 12, line 1, delete "claim 8" and insert
    --claim 10--.
Column 12, line 6, delete "elected" and insert
    --selected--.
```

Signed and Sealed this

Twenty-ninth Day of August, 1995

Attest:

BRUCE LEHMAN

Attesting Officer     Commissioner of Patents and Trademarks